United States Patent Office 3,701,645
Patented Oct. 31, 1972

3,701,645
CROP CULTURE WITH 1H-1,2,4-TRIAZOLES
Henry H. Scott, 2672 W. Newell Ave.,
Walnut Creek, Calif. 94595
No Drawing. Continuation-in-part of application Ser. No. 767,830, Oct. 15, 1968. This application Sept. 25, 1970, Ser. No. 75,770
Int. Cl. C05g 3/08
U.S. Cl. 71—1
14 Claims

ABSTRACT OF THE DISCLOSURE

The present invention relates to crop culture and is particularly concerned with practices for conserving soil nitrogen and for supplying the requirements for plant nutrition. These practices involve the employment, as active agent, of such triazole compound as 1H-1,2,4-triazole, as well as other triazole compounds, which are substituted in the 1-position by alkylcarboxylate, alkylthiocarboxylate, carboxamide or thiocarboxamide groups. Useful compositions employing such compounds are also disclosed. Typical compositions comprise a reduced nitrogen fertilizer and a triazole compound.

CROSS REFERENCE TO RELATED APPLICATION

This application is a continuation-in-part of my copending application Ser. No. 767,830, filed Oct. 15, 1968 and now abandoned.

BACKGROUND OF THE INVENTION

The nature of the agricultural problem for which the present invention constitutes a remedy, has previously been discussed in the prior art: see, for example, the introduction to U.S. Pat. 3,135,594, dated June 2, 1964.

SUMMARY OF THE INVENTION

The present invention is directed to a method and composition useful therewith in crop culture, and is particularly concerned with new agronomical practices and compositions for conserving nitrogen in soil, by suppressing the nitrification of ammonium nitrogen therein. The active agent of the compositions employed in such methods is a triazole compound corresponding to the formula:

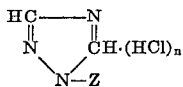

In this and succeeding formulae, Z represents hydrogen, carbamoyl ($CONH_2$), thiocarbamoyl ($CSNH_2$), methylcarbamoyl ($CONHCH_3$), methylthiocarbamoyl

dimethylcarbamoyl ($CON(CH_3)_2$), dimethylthiocarbamoyl ($CSN(CH_3)_2$), methylcarboxylate ($COOCH_3$), ethylcarboxylate ($COOC_2H_5$), methylthiocarboxylate

or ethylthiocarboxylate ($CSOC_2H_5$); and $n$ represents an integer of 0 or 1 with the proviso that when Z is other than hydrogen, $n$ is 0.

For convenience of description, those compounds which come within the scope of the above definition will be referred to herein as "1H-1,2,4-triazoles" or simply as "triazoles."

Representative triazoles which can be employed in accordance with this invention include 1H-1,2,4-triazole;
1H-1,2,4-triazole-1-carboxamide;
1H-1,2,4-triazole-1-thiocarboxamide;
1H-1,2,4-triazole-1-carboxylic acid:methyl ester;
1H-1,2,4-triazole-1-carboxylic acid:ethyl ester;
1H-1,2,4-triazole-1-thiocarboxylic acid:methyl ester;
1H-1,2,4-triazole-1-thiocarboxylic acid:ethyl ester;
N,N-dimethyl-1H-1,2,4-triazole-1-thiocarboxamide;
N,N-dimethyl-1H-1,2,4-triazole-1-carboxamide;
1H-1,2,4-triazole:hydrochloride;
N-methyl-1H-1,2,4-triazole-1-carboxamide and
N-methyl-1H-1,2,4-triazole-1-thiocarboxamide.

The method of the present invention comprises impregnating a plant growth medium with the triazole compound either with or without an adjuvant. The triazole compound, when present in effective amounts, acts to suppress nitrification of ammonium nitrogen in the soil to nitrate nitrogen, thereby preventing rapid loss of ammonium nitrogen from the soil.

In the practice of the present invention, an effective nitrification-inhibiting amount of a triazole compound, as set forth hereinbefore, is incorporated into soil or other growth medium.

Ordinarily the present invention is carried out either by distributing the triazole compound in an unmodified form through the soil or other growth medium or distributing the compound in such media as a constituent in liquid or finely divided compositions. In the latter practice the triazole compound can be modified with one or more additaments or soil treating adjuvants including water, petroleum distillates or other liquid carriers, surface-active dispersing agents, inert finely divided solids and fertilizers such as reduced nitrogen fertilizers. Preferred adjuvants are surface-active dispersing agents, inert finely divided solids, and, especially, reduced nitrogen fertilizers; these adjuvants cooperate with the triazole compound so as to facilitate the practice of the present invention and to obtain an improved result. Depending upon the concentration of the triazole compound, augmented compositions can be distributed in the soil without further modification or can be considered as concentrates and subsequently diluted with additional inert carrier, to produce the ultimate treating composition. The required amount of the triazole compound can be supplied to growth media in from 1 to 50 gallons of organic solvent carrier, in from 5 to 27,000 or more gallons of aqueous carrier or in from 20 to 2,000 pounds of solid carrier per acre treated. When an organic solvent carrier is employed, it can be further dispersed in the above volume of aqueous liquid carrier.

The provision of an effective, nitrification-inhibiting, dosage of the triazole compound in the soil or growth medium is essential for the practice of the present invention. In general, good results are obtained when the growth medium is impregnated with the triazole compound in the amount of from about 0.01 part to about 4000 parts or more by weight per million parts by weight of growth medium. (Hereinafter, the term p.p.m. is employed, as customary, to designate parts per million.) The preferred amounts to be employed are dependent upon the particular situation. Thus, in determining the amount to be employed, consideration is made not only of the treatment need, i.e., soil pH, temperature, soil type, etc., but also of the mode of application to soil. When the triazole compound is to be applied in a broadcast application, the amount in p.p.m. may frequently be less than in row or band application where for a substantial depth and width the vicinity of application there can be a very high concentration of the triazole compound. When application is made near the root zone of growing plants or when application is made immediately prior to seeding or transplanting, the amounts supplied are frequently at a lower rate than when application is made at the end of the growing season to prepare the soil for the following season. By dispersing very large dosages in growth media, a prolonged inhibition of nitrification can be obtained over a period of many months. The concentration of the active triazole compound is eventually reduced to a minimum by decomposition in the soil.

In one specific embodiment for carrying out the present invention, the triazole compound is distributed throughout the growth media in a broadcast application such as by spraying, dusting, distributing in irrigation water, etc. In such application, the triazole compound is supplied in amounts sufficient to permeate the growing area of soil with an amount of from about 0.1 to about 1000 p.p.m., and preferably, from about 2 to about 250 p.p.m. In field administration, the triazole compound can be distributed in the soil in the amount of at least 0.2 pound per acre and through such cross-section of the soil as to provide for the presence therein of an effective concentration of the agent. It is usually preferred that the triazole compound be distributed to a depth of at least two inches below the soil surface and at a dosage of at least 0.1 pound per acre inch of soil.

In another embodiment for carrying out the present invention, the triazole compound is administered to growth medium in a band or row application. In such application, administration is made with or without carrier in amounts sufficient to supply to soil or growth medium a concentration of the triazole compound which can be as high as 4000 p.p.m. or more. After administration with or without disking or dragging, subsequent irrigation or rainfall distributes the triazole compound throughout the growth medium.

In one embodiment of the present invention, the triazole compound is distributed throughout the growth media prior to seeding or transplanting the desired crop plant.

In another embodiment, the soil in the root zone of growing plants is treated with the triazole compound in an amount effective to inhibit nitrification but sublethal to plant growth. In such operations, the compounds should be supplied in the soil in amounts which have preferred upper limits at about 50 p.p.m. By following such practice, no adverse effect is exerted by the triazole compound upon growth of seeds or plants. Oftentimes it is desirable to treat the soil adjacent to plants, and this procedure may be carried out conveniently in side-dressing operations.

In a further embodiment, soil can be treated with the products following harvest or after fallowing to prevent rapid loss of ammonium nitrogen and to build up the ammonium nitrogen formed by conversion of organic nitrogen compounds. Such practice conserves the soil nitrogen for the following growing season. In such application the upper limit is primarily an economic consideration.

In an additional embodiment, the soil is treated with the triazole compound in conjunction with the application of reduced nitrogen fertilizers. The treatment with the triazole compound can be carried out prior to, subsequent to or simultaneously with the application of fertilizers. Such practice prevents the rapid loss of the ammonium nitrogen added as fertilizer and the ammonium nitrogen formed from the organic reduced nitrogen in fertilizers by the action of soil bacteria. The administration to the soil of the triazole compound in an ammonium nitrogen fertilizer composition constitutes a preferred embodiment of the present invention.

The expression "reduced nitrogen fertilizers" is employed in the present specification and claims, as understood in the art, as embracing both inorganic and organic nitrogenous materials containing nitrogen in the reduced state. Examples of known reduced nitrogen fertilizers include anhydrous and aqueous ammonia, inorganic ammonium salts such as ammonium phosphate, ammonium nitrate and ammonium sulfate, ammonium salts of organic acids, urea, cyanamide, guanidine nitrate, di-cyandiamide, amino acids, guanyl urea sulfate, thiourea, Uramon nitrogenous solutions containing fixed nitrogen in the form of urea and free ammonia, amines, urea-form and other nitrogen-containing organic chemical fertilizers as well as protein mixtures, animal tankages, green manure, fish products, crop residues, and other natural materials known to be sources of ammonium ions in soil. These fertilizer materials contain nitrogeneous compounds in which the apparent valency or oxidation state of the nitrogen is from minus 3 to minus 1, inclusive. Furthermore, inasmuch as the following equilibrium exists in the presence of water even when the latter is present in minor proportions.

$$NH_3 + H_2O \rightleftharpoons NH_4OH \rightleftharpoons NH_4^+ + OH^-$$

it is to be understood that when reference is made herein to either ammonium ion or ammonia in soil it is meant to embrace the other component, namely, ammonia or ammonium ion, respectively.

The actual concentration of the triazole compound in compositions to be employed for the treatment of growth media is not critical and can vary considerably provided an effective, nitrification-inhibiting dosage of the triazole compound is supplied to the growth media. In general, good results are obtained with liquid compositions containing from about 0.0001 to about 0.25 percent by weight of the triazole compound; in some operations, however, compositions containing amounts of triazole compound in excess of 0.25 percent, such as from 2 to 98 percent of triazole compound by weight of composition, are conveniently employed, as for example in row or band application. With dusts, good results are usually obtained with compositions containing from 0.001 to 10 percent or more by weight of triazole compound. In some circumstances, such as in high-intensity application, however, it is preferred to employ dust compositions containing as much as from 2 to 98 percent or more by weight of the triazole compound. Liquid or dust compositions in which the triazole compound is present in higher concentration can be utilized as such or can be employed as concentrate compositions to be diluted to prepare actual treating compositions.

Liquid compositions containing the desired amount of the triazole compound can be prepared by dispersing the latter in one or more liquid carriers such as water or an organic solvent, with or without the aid of a suitable surface-active dispersing agent or emulisifying agent. Suitable organic solvents include, for example, acetone, diisobutylketone, methanol, ethanol, isopropyl alcohol, diethyl ether, toluene, methylene chloride, chlorobenzene and the petroleum distillates. The preferred oganic solvents are those which are of such volatility that they leave little permanent residue in the growth media. When the solutions of the triazole compound in organic solvents are to be further diluted to produce aqueous dispersions, the preferred solvents include acetone and the alcohols. When the liquid carrier is entirely organic in nature, particularly desirable carriers are the petroleum distillates boiling almost entirely under 400° F. at atmospheric pressure and having a flashpoint above about 80° F. Dispersing and emulsifying agents which can be employed in liquid compositions include condensation products of alkylene oxides with phenols and organic acids, alkyl aryl sulfonates, polyoxyalkylene derivatives of sorbitan esters, complex ether alcohols, mahogany soaps and the like. The surface-active agents are generally employed in the amount of from 1 to 20 percent of weight of the triazole compound.

Solid compositions containing the active agent can be prepared by dispersing the latter in finely divided inert solid carriers such as sugar, salt, talc, chalk, gypsum, vermiculite and the like. Similarly, dust compositions containing the active compounds are prepared from various of the solid, surface-active dispersing agents such as fuller's earth, attapulgite and other clays, as well as from solid fertilizer compositions. In preparing such compositions, the carrier is mechanically ground with the triazole compound or wet with a solution or dispersion thereof in a volatile organic solvent. These solid compositions may, if desired, also contain an alkyl aryl sulfonate or other surface-active dispersing agent. Depending upon the proportions of ingredients, these compositions can be employed without further modification or be considered as concentrates and subsequently further diluted with solid-surface-active dispersing agent, talc, chalk, gypsum, or the like to obtain the desired treating composition. Furthermore, such concentrate compositions can be dispersed in water with or without added dispersing agent or agents to prepare aqueous soil treating compositions.

Soil treatment compositions can be prepared by dispersing the triazole compound in fertilizers such as ammonium fertilizer or organic nitrogen fertilizer. The resulting fertilizer composition can be employed as such or can be modified as by dilution with additional nitrogen fertilizer or with inert solid carrier to obtain a composition containing the desired amount of active agent for treatment of soil. Further, an aqueous dispersion of the triazole compound-fertilizer composition can be prepared and administered to the growth meduim. Fertilizer compositions comprising the triazole compound in intimate admixture with ammonium fertilizers constitute preferred embodiments of the present invention.

In fertilizer compositions comprising a reduced nitrogen fertilizer, it is desirable that the triazole compound be present in an amount of at least about 0.25 percent by weight based on the weight of the nitrogen present in the fertilizer as reduced nitrogen, and the triazole can be present in amounts as high as 95 percent by weight of the reduced nitrogen in the fertilizer. Generally, though, amounts of triazole compound in excess of about 25 percent yield no greater advantage and are therefore seldom used. Thus, when a fertilizer composition contains both reduced nitrogen and other forms of nitrogen, such as in the case of ammonium nitrate fertilizer compositions, the amount of triazole compound is based on the weight of nitrogen present in the ammonium component.

In operations carried out in accordance with the present invention as indicated hereinbefore, the soil can be impregnated in any convenient fashion with the active triazole compound or a composition containing the latter. For example, these modified or unmodified compositions can be mechanically mixed with the soil; applied to the surface of soil and thereafter dragged or disked into the soil to a desired depth; or transported into the soil with a liquid carrier such as by injection, spraying or irrigation. When the distribution is carried out by introducing the triazole compound in the water employed to irrigate the soil, the amount of water is varied in accordance with the moisture content of the soil in order to obtain a distribution of the triazole compound to the desired depth. The triazole compound can be readily and conveniently distributed to a depth of a few inches to four feet by irrigation methods. The preferred methods embace procedures using any of these steps or combination of steps wherein triazole compound is distributed in the soil substantially simultaneously with a reduced nitrogen fertilizer.

By the practice of this invention, the nitrification of ammonium nitrogen in the soil to nitrate nitrogen is suppressed, thereby preventing the rapid loss of ammonium nitrogen from the soil. Furthermore, by proper distribution of the triazole compound, this action of inhibiting the transformation of ammonium nitrogen to nitrate nitrogen is effective over a prolonged period of time. The ammonium nitrogen may arise from added ammonium nitrogen fertilizers or be formed in the soil by conversion of the organic nitrogen constituents found in soil or added thereto as components of organic fertilizers.

The following examples illustrate the invention but are not to be construed as limiting.

EXAMPLE 1

In a representative operation, aqueous compositions each containing one of 1H-1,2,4-triazole-1-carboxylic acid:methyl ester; 1H - 1,2,4 - triazole - 1 - carboxylic acid:ethyl ester; N,N - dimethyl-1H-1,2,4-triazole-1-thiocarboxamide; 1H-1,2,4-triazole:hydrochloride and N,N-dimethyl-1H-1,2,4-triazole - 1 - carboxamide and an ammonium fertilizer are prepared by separately dissolving one of the triazole compounds in acetone and diluting the acetone solution with an aqueous solution of ammonium sulfate. The compositions thus prepared each contained 500 p.p.m. of nitrogen and 25 p.p.m. of one of said triazole compounds. The amount of nitrogen expressed in this and other examples is based on the nitrogen present in the fertilizer in reduced form.

The aqueous compositions so prepared are employed to treat seed beds of sandy loam soil having a pH of about 8, containing essentially no organic matter and having been free of nitrite and nitrate nitrogen by prior thorough leaching. In the treating operation, the seed beds are air dried and the compositions are applied to the dried seed beds, as a soil drench, in an amount sufficient to provide one of the triazole compounds at a concentration of 5 p.p.m. together with a known amount of ammonium sulfate, sufficient to provide approximately 100 p.p.m. of nitrogen. A similar seed bed is treated in the same manner with an aqueous composition containing the same amount of ammonium sulfate and acetone, but no triazole compound, to serve as a check. The seed beds are sealed to prevent moisture loss and incubated at about 70° F. for two weeks. At the end of this test period, the seals are removed and the soil in the seed beds analyzed for combined nitrite plus nitrate nitrogen. The determinations are carried out by extracting the nitrate and nitrite from the soil with a saturated calcium sulfate solution, developing color in the clear supernatant of the extract with diphenylamine in sulfuric acid, and comparing the color with a standard solution containing known concentrations of nitrate and nitrite ions. This procedure is similar to that described in "Colorimetric Methods of Analysis," by F. D. Snell and C. T. Snell, D. Van Nostrand Company, Inc., volume II, 3rd edition, page 801.

The results of the determinations are set forth in the following table:

TABLE A

| Test compound: | Percent control of nitrification |
|---|---|
| 1H-1,2-4-triazole-1-carboxylic acid:methyl ester | 95 |
| 1H-1,2,4-triazole-1-carboxylic acid:ethyl ester | 90 |
| N,N-dimethyl 1H-1,2,4-triazole - 1 - thiocarboxamide | 80 |
| 1H-1,2,4-triazole:hydrochloride | 90 |
| N,N-dimethyl 1H-1,2,4-triazole-1-carboxamide | 95 |
| Check | 0 |

EXAMPLE 2

In similar operation, aqueous reduced nitrogen fertilizers containing 10 p.p.m. of a triazole compound and 1000 p.p.m. nitrogen are prepared by dispersing an 0.8 percent (weight by volume of solvent) acetone solution of the triazole compound in an aqueous ammonium sulfate solution.

Seed beds of alkaline sandy loam soil containing negligible amounts of ammonium nitrogen are then treated separately with the ammonium sulfate fertilizer compositions, using the soil drench method, in an amount sufficient to provide 2 p.p.m. of the triazole compound. A similar seed bed is treated in this same manner with an aqueous ammonium sulfate solution containing acetone, but no triazole compound, to serve as a check. Both the test seed beds and the check beds initially contain about 20 p.p.m. of ammonium nitrogen. The seeds beds are sealed and incubated for 4 weeks at 70° F. The air over the seed beds is changed weekly.

At the end of the test period, the ammonium nitrogen content of the soil in each seed bed is determined by a procedure involving distillation of the ammonia from the soil in the presence of magnesium oxide, sorption of the ammonia by boric acid, and titration of the resulting solution with a standard solution of hydrogen chloride. This method of analysis is a slight modification of that described by Black on page 1198 of "Methods of Soils Analysis," No. 2, American Society of Agronomy, Inc., Madison, Wis., 1965. The soil in the check seed bed is found to have undergone substantially complete nitrification and no detectable ammonia is recovered therefrom. In contrast, the soil in the seed beds treated with a triazole compound undergoes little if any nitrification. Specifically, the degree of nitrification with 1H-1,2,4-triazole:hydrochloride; 1H - 1,2,4-triazole - 1 - carboxylic acid:methyl ester; 1H-1,2,4-triazole-1-carboxylic acid:ethyl ester and N,N-dimethyl-1H-1,2,4-triazole - 1 - carboxamide is 0, 2, 2 and 0 percent, respectively. Expressed otherwise, of the nitrogen added as ammonium sulfate there is recovered 100, 98, 98 and 100 percent, respectively.

EXAMPLE 3

Following a procedure similar to that of Example 2, aqueous reduced nitrogen fertilizers containing ammonium sulfate and one of 1H-1,2,4-triazole; 1H-1,2,4-triazole-1-carboxamide; 1H-1,2,4-triazole-1-thiocarboxamide; 1H-1,2,4-triazole-1-thiocarboxylic acid:methyl ester; 1H-1,2,4-triazole-1-thiocarboxylic acid:ethyl ester; N-methyl-1H-1,2,4-triazole-1-thiocarboxamide and N-methyl-1H-1,2,4-triazole-1-carboxamide are prepared to contain various concentrations, from 10 to 25 percent, of the triazole compound based on the ammonium nitrogen content of the composition. The compositions are distributed in soil at rates varying from about 20 to 100 parts of the triazole compound per million parts of soil. Recovery of ammonium nitrogen after 4 weeks incubation is excellent in all cases wherein a triazole compound is employed. In contrast, soil treated with check fertilizers containing no triazole compound is found to undergo substantially complete nitrification.

The operation of this example is conducted with 1H-1,2,4-triazole-1-carboxylic acid:ethyl ester as well as with 1H-1,2,4-triazole:hydrochloride. The test procedure used with each chemical is one wherein soil-treating compositions are prepared by first dissolving the triazole compound in acetone at four concentration levels to provide solutions containing 4, 2, 1 and ½ percent, respectively, on a weight per volume basis. A fertilizer component is prepared by mixing 0.05 percent of an emulsifying agent (polyethylene glycol 600 oleate) in aqua ammonia containing 21 to 23 percent nitrogen. The solution of each triazole compound and the fertilizer are then mixed together in varying proportions so as to provide compositions variously containing 2, 1, 0.5 and 0.25 percent by weight of the triazole compound in terms of the weight of nitrogen present in the composition. Seed beds of a sandy loam soil having a pH of 8 and a 12 percent moisture content are treated with the above described compositions. This treatment is carried out in such a fashion as to provide the seed bed with a concentration of 125 p.p.m. by weight of nitrogen, the composition being injected into the seed bed at a point about 3 inches below the soil surface. Other seed beds having the same characteristics are treated with compositions differing from the foregoing only in the absence of the triazole compound to serve as checks. Following the treatment, all seed beds are sealed to prevent loss of moisture and the soil is maintained at 70° F. for 30 days. At the end of this time, the treated and the check seed beds are analyzed for ammonium nitrogen in accordance with the same procedure as described above in Example 2. The results of the operations are as reported below:

| Triazole compound (parts by weight per 100 parts by weight of nitrogen): | Parts by weight ammonium nitrogen recovered from 125 parts by weight added |
|---|---|
| 1H-1,2,4-triazole-1-carboxylic acid:ethyl ester— | |
| 2.0 | 125 |
| 1.0 | 94 |
| 0.5 | 58 |
| 0.25 | 28 |
| 1H-1,2,4-triazole:hydrochloride— | |
| 2.0 | 125 |
| 1.0 | 106 |
| 0.5 | 68 |
| 0.25 | 62 |
| None (check) | 0 |

EXAMPLE 5

The operation of this example is conducted with each of 1H-1,2,4-triazole-1-carboxylic acid:ethyl ester and 1H-1,2,4-triazole:hydrochloride. The test procedure is one wherein a nitrification inhibitor component is prepared by (a) mixing and grinding together 0.1 gram of each triazole compound and 0.15 gram of attapulgite, (b) adding 0.75 gram of pyrophyllite thereto and grinding the resulting mixture until a finely powdered uniform composition is obtained. A fertilizer component is prepared by hammermilling together a 50:50 mixture by weight of ammonium sulfate and pyrophyllite to obtain a fine uniform composition. The inhibitor component and fertilizer component are mixed together on a roller mill to obtain soil-treating compositions containing a triazole compound in varying concentrations expressed as percent based on the weight of nitrogen in the composition, these varying concentrations being 2, 1, 0.5 and 0.25 percent. These compositions are employed to fertilize various beds of sandy loam soil containing very little organic material, having a pH of about 8, and having a moisture content of about 20 percent. The beds are in containers which admit of being sealed to prevent loss of moisture. The seed beds are fertilized in areas to be planted by providing depressions and adding thereto the fertilizer treating composition and then covering the composition with soil. The amount of composition employed is sufficient to supply 206 parts by weight of nitrogen and, variously, 4, 2, 1 and 0.5 parts by weight of each triazole compound, per million parts by weight of soil. Thereupon, the seed beds are sealed to prevent loss of moisture and the soil maintained at temperatures of about 70° F. for 5 weeks. At 7 day intervals, the seals are removed, air passed over the soil, and the seals then replaced. At the end of the 5 week period, the seals are finally removed and samples of soil are analyzed, as described in Example 2, for ammonium nitrogen content. The results are compared with check seed beds wherein no triazole compound is added to the fertilizer composition, but which are otherwise identically handled. The results obtained are as reported below:

| Triazole compound (parts per million parts by weight of soil): | Parts by weight ammonium nitrogen recovered from 206 parts by weight added |
|---|---|
| 1H-1,2,4-triazole-1-carboxylic acid:ethyl ester— | |
| 4 | 174 |
| 2 | 190 |
| 1 | 172 |
| 0.5 | 166 |
| 1H-1,2,4-triazole:hydrochloride— | |
| 4 | 186 |
| 2 | 178 |
| 1 | 176 |
| 0.5 | 134 |
| None (check) | 0 |

EXAMPLE 6

Concentrate compositions are prepared as follows:

(A) 25 parts by weight of 1H-1,2,4-triazole-1-carboxylic acid:methyl ester, 65 parts by weight of xylene and 10 parts by weight of an alkylated aryl polyether alcohol (Triton X-100) are mechanically mixed together to obtain an emulsifiable liquid composition.

(B) 90 parts by weight of 1H-1,2,4-triazole:hydrochloride and 10 parts by weight of alkyl aryl sulfonate (Acto 700) are mechanically mixed together to obtain a water-dispersible mixture.

A composition of each of the two foregoing types is similarly prepared with each of the other triazole compounds recited in Examples 1, 2 and 3.

The foregoing compositions can be dispersed in water to produce aqueous compositions having desirable wetting and penetrating properties. These aqueous compositions are then employed to treat soil in an amount sufficient to distribute the triazole therein in effective nitrification inhibiting concentrations. The concentrates can also be dispersed in aqueous ammonia to prepare reduced nitrogen fertilizer compositions.

EXAMPLE 7

Fertilizer compositions are prepared as follows:

(A) 1H-1,2,4-triazole-1-carboxylic acid:ethyl ester is mechanically mixed with diammonium phosphate to prepare a reduced nitrogen fertilizer composition containing 5 percent by weight of the triazole compound.

(B) 1H-1,2,4-triazole-1-thiocarboxamide is mechanically mixed with urea to prepare a reduced nitrogen fertilizer composition containing 2 percent by weight of the triazole compound.

A composition of each of these two types is similarly prepared with each of the other triazole compounds set forth in Examples 1, 2 and 3.

These fertilizer compositions are distributed in soil to supply the nitrogen requirements for plant nutrition. The treated soil is resistant to nitrification and provides nitrogen available for plant growth over a prolonged period of time.

EXAMPLE 8

A solid fertilizer composition is prepared as follows: (1) a nitrification inhibitor component is prepared by mixing together 5 parts by weight of 1H-1,2,4-triazole:hydrochloride with 1.5 parts of attapulgite clay and then adding 7.5 parts of pyrophyllite thereto and grinding the mixture until a finely powdered uniform composition is obtained: (2) a fertilizer component is prepared by hammermilling together equal parts by weight of ammonium sulfate and pyrophyllite to obtain a fine uniform composition: and (3) the inhibitor and fertilizer components are mixed together on a rolling mill in varying proportions so as to obtain soil treating compositions containing the triazole in concentrations of 0.5, 1 and 2 percent based on the weight of nitrogen in the composition.

The various 1H-1,2,4-triazole compounds which are employed in the present invention can be prepared by known procedures and methods analogous thereto. 1H-1,2,4-triazole may be prepared by heating formamide with formic acid hydrazide. The reactants combine readily in equimolar proportions, with water being formed as a by-product in the ensuing cyclodehydration reaction. In another method for preparing this compound, thiosemicarbazide is converted to its formyl derivative by brief heating with 90% formic acid; the formyl derivative is then cyclized to 3-thio-1,2,4-thiazole by treatment with alkali, following which the thiol group is removed by oxidation with nitric acid catalyzed by nitrous acid.

The 1-substituted triazole compounds are formed by reacting 1H-1,2,4-triazole with a substituted acyl chloride of the formula Z—Cl, wherein Z has the significance described hereinabove. The triazoles substituted in the 1-position by a carboxamide or a thiocarboxamide group are formed by reacting the triazole starting material with an appropriate carbamoyl or thiocarbamoyl chloride, respectively. The triazoles substituted in the 1-position by a loweralkylcarboxylate group are formed by reacting the triazole starting compound with methyl chloroformate or ethyl chloroformate, while the corresponding thiocarboxylate compounds are formed using either methyl chlorothioformate or ethyl chlorothioformate. The reaction proceeds when the reactants are contacted and mixed in the presence of a hydrogen chloride acceptor such as pyridine, lutidine or the like, or a tertiary alkylamine such as trimethylamine or triethylamine. The reaction is preferably carried out in the presence of an inert organic solvent as a reaction medium. Representative and suitable organic solvents which can be employed as reaction media include benzene, nitromethane and chlorinated solvents such as chloroform and carbon tetrachloride. The reaction proceeds readily at temperatures of from minus 20° to 100° C. When Z is loweralkyl thiolcarbonyl, the reaction is preferably carried out at minus 20° to 80° C. The reaction is preferably carried out at the boiling temperature of the reaction mixture and under reflux in all other cases. The exact proportions of the reactants are not critical, some of the desired product being obtained when the reactants are employed in any proportion. However, in going to completion, the reaction consumes the reactants and the hydrogen chloride acceptor in equimolar proportions, and the use of the reactants and the hydrogen chloride acceptor in such proportions is preferred. During the reaction, the hydrochloride salt of the hydrogen chloride acceptor forms and may precipitate from the mixture. This salt can be removed by such conventional procedures as extraction, filtration or centrifugation. The substituted 1H-1,2,4-triazole product can be separated by such conventional procedures as evaporation and purified by conventional procedures such as recrystallization.

The hydrochloride addition salt of 1H-1,2,4-triazole is prepared by a standard procedure, in which the triazole compound is reacted with hydrochloric acid. The reaction is carried out in a liquid reaction medium and the reactants are employed in amounts representing stoichiometric proportions. The reaction goes forward readily at room temperatures with the preparation of the desired salt product, which typically appears in the liquid reaction mixture as a crystalline solid. The product, a solid, is separated by filtration or decantation, or the liquid reaction mixture can be removed by evaporation to separate the product. The salt product is of low solubility in organic liquids and of moderate solubility in water.

I claim:

1. A method for suppressing the nitrification of ammonium nitrogen in a plant growth medium, which comprises distributing in the plant growth medium a nitrification-inhibiting amount of a triazole compound corresponding to the formula

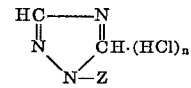

wherein Z represents hydrogen, methylcarboxylate, ethylcarboxylate, methylthiocarboxylate, ethylthiocarboxylate, carbamoyl, thiocarbamoyl, methylthiocarbamoyl, methylcarbamoyl, dimethylcarbamoyl or dimethylthiocarbamoyl; and $n$ represents an integer of 0 or 1 with the proviso that when Z is other than hydrogen, $n$ is 0.

2. The method of claim 1 wherein the compound is 1H-1,2,4-triazole-1-carboxylic acid:methyl ester.

3. The method of claim 1 wherein the compound is 1H-1,2,4-triazole-1-carboxylic acid:ethyl ester.

4. The method of claim 1 wherein the compound is N-N-dimethyl 1H-1,2,4-triazole-1-thiocarboxamide.

5. The method of claim 1 wherein the compound is N,N-dimethyl 1H-1,2,4-triazole-1-carboxamide.

6. The method of claim 1 wherein the compound is 1H-1,2,4-triazole:hydrochloride.

7. A composition comprising a reduced nitrogen fertilizer in admixture with a nitrification-inhibiting amount of a triazole compound corresponding to the formula

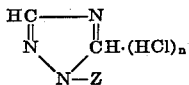

wherein Z represents hydrogen, methylcarboxylate, ethylcarboxylate, methylthiocarboxylate, ethylthiocarboxylate, carbamoyl, thiocarbamoyl, methylthiocarbamoyl, methylcarbamoyl, dimethylcarbamoyl or dimethylthiocarbamoyl; and $n$ represents an integer of 0 or 1 with the proviso that when Z is other than hydrogen, $n$ is 0.

8. The composition of claim 7 wherein the triazole is 1H-1,2,4-triazole-1-carboxylic acid:methyl ester.

9. The composition of claim 7 wherein the triazole is 1H-1,2,4-triazole-1-carboxylic acid:ethyl ester.

10. The composition of claim 7 wherein the triazole is N,N-dimethyl 1H-1,2,4-triazole-1-thiocarboxamide.

11. The composition of claim 7 wherein the triazole is N,N-dimethyl 1H-1,2,4-triazole-1-carboxamide.

12. The composition of claim 7 wherein the triazole is 1H-1,2,4-triazole:hydrochloride.

13. A method comprising distributing in a plant growth medium a nitrification inhibiting amount of 1,2,4-triazole or a mineral acid addition salt thereof.

14. A composition comprising a nitrogen fertilizer as a source of ammonium ions in admixture with a nitrification inhibiting amount of 1,2,4-triazole or a mineral acid addition salt thereof.

References Cited
UNITED STATES PATENTS

| | | | |
|---|---|---|---|
| 3,235,558 | 2/1966 | Harrison | 71—1X |
| 3,494,757 | 2/1970 | Osborne | 71—1 |

REUBEN FRIEDMAN, Primary Examiner

R. BARNES, Assistant Examiner

U.S. Cl. X.R.

71—27